(No Model.)
M. BOURKE.
WINDOW CLEANER.
No. 355,298. Patented Jan. 4, 1887.
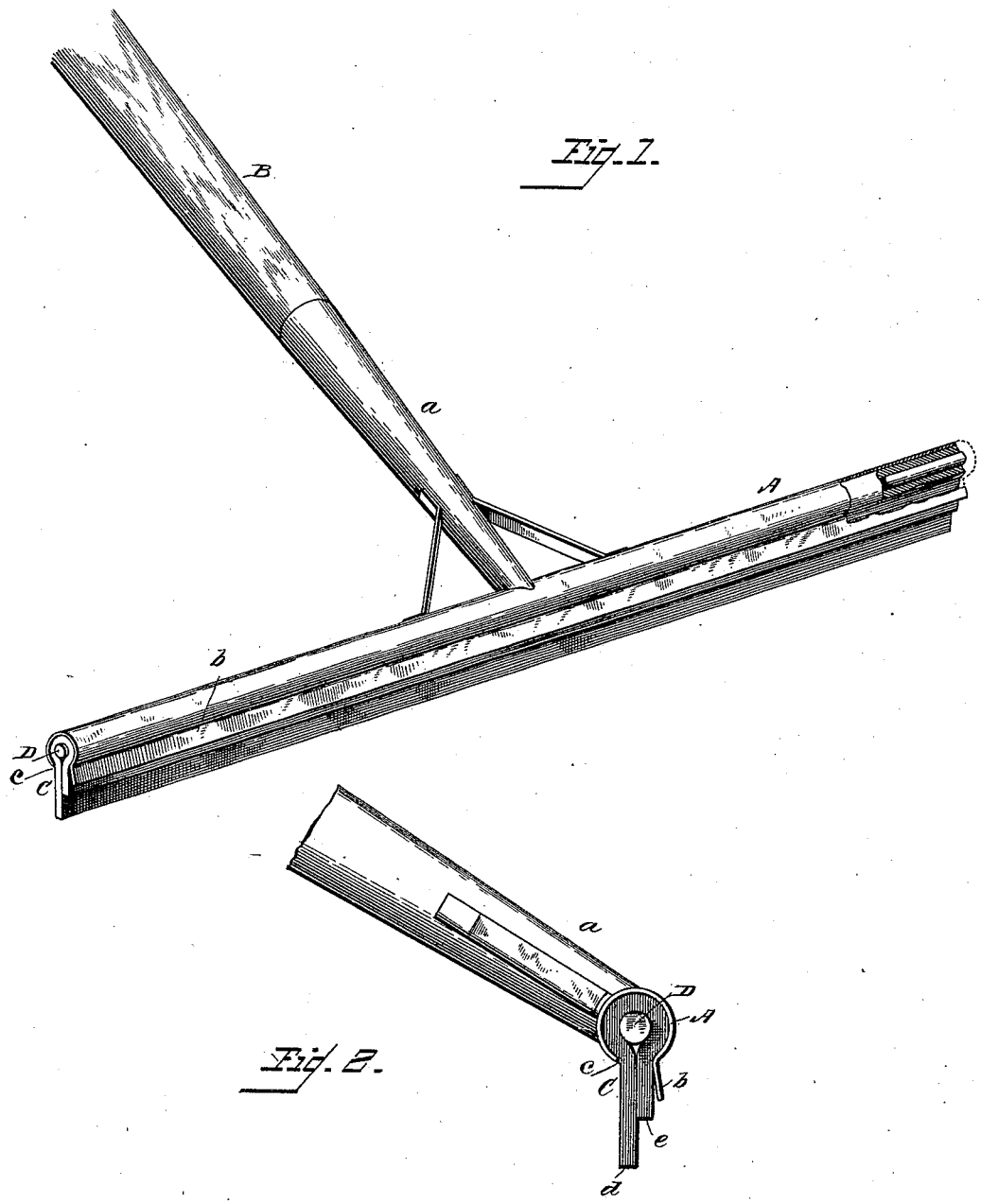

UNITED STATES PATENT OFFICE.

MARTIN BOURKE, OF YOUNGSTOWN, OHIO.

WINDOW-CLEANER.

SPECIFICATION forming part of Letters Patent No. 355,298, dated January 4, 1887.

Application filed June 8, 1886. Serial No. 204,499. (No model.)

*To all whom it may concern:*

Be it known that I, MARTIN BOURKE, a citizen of the United States, residing at Youngstown, in the county of Mahoning and State of Ohio, have invented certain new and useful Improvements in Window-Cleaners; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a side view thereof.

The present invention has relation to that class of devices adapted for cleaning and drying window-panes, mirrors, and smooth surfaces, wherein is employed a strip of rubber or felt secured to a head or holder provided with a suitable handle, the head or holder having an open slot extending its entire length, through which project the folded edges of the rubber or felt strip, held in the head or holder by a key, around which the strip is folded.

The invention has for its object to provide the head or holder with a depending bearing-flange, to form a support for the cleaning-strip when pressure is brought against it, as shown in the drawings, and hereinafter described and claimed.

In the accompanying drawings, A represents the head or holder, provided with a socket, a, for securing thereto a suitable handle, B. In place of a socket, a screw rod or shank may be used, or any other well-known means may be provided by which a handle can be attached to the head or holder, preferably constructed of metal; but other materials may be used. This head or holder A is constructed of sheet metal, and consists of a slotted tube, and for convenience I will hereinafter term it the "tubular head or holder," in contradistinction to those in ordinary use, the same having a longitudinal bearing-flange, b, extending outwardly at an angle, as shown, to form a support for the strip C as pressure is brought against it when in use.

The cleaning-strip C, which may be of rubber, felt, or other suitable material, is held within the tube by a key, D, said key extending the entire length of the head or holder.

To secure the strip C in place, it is first doubled upon itself and inserted through the slot c of the tube constituting the head or holder A, and when the edges of the strip are adjusted with relation to each other the key D is inserted, and as it is pushed through the tube the strip will be expanded against the interior sides thereof, which will firmly hold it in place, and by removing the key the rubbing-edges d e of the strip C can be brought together on the same plane or farther apart, as desired, or the rubbing portion of the strip lengthened.

It frequently requires a broader bearing or rubbing edge, particularly when cleaning very dirty glass, and also that the strip should be more rigid, which is done by bringing the rubbing-edges, as above described, together on the same plane; and when cleaning very thin glass it is essential that the rubbing portion of the strip should be more flexible, to avoid any great pressure on the glass, this being accomplished by extending or drawing out to greater length one edge of the strip. In either case the bearing-flange b forms a support for the rubber or felt strip, to give it the required rigidity when pressure is brought against it in cleaning the window.

Having now fully described my invention, what I claim as new, and desire to secure by Letters Patent, is—

In a window-cleaner, the combination, with a rubber strip and key, of a tubular sheet-metal head having a slot and depending bearing-flange at the outer edge thereof, substantially as and for the purpose specified.

In testimony that I claim the above I have hereunto subscribed my name in the presence of two witnesses.

MARTIN BOURKE.

Witnesses:
A. C. RAWLINGS,
M. P. CALLAN.